April 18, 1950    O. F. RHODES    2,504,450
LIQUID LEVEL CONTROLLED FILLING SPOUT
Filed Feb. 12, 1947    2 Sheets-Sheet 1
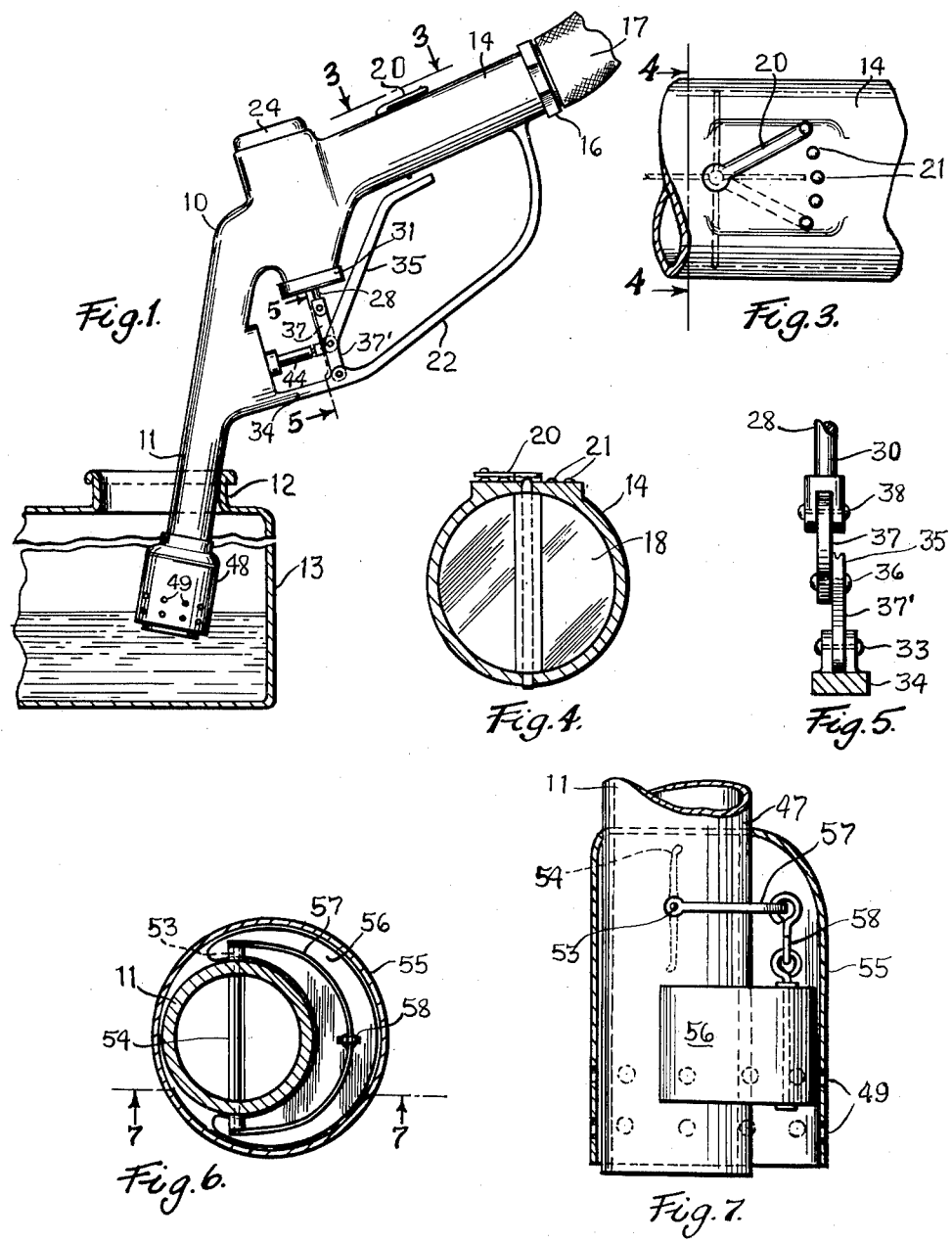
INVENTOR.
Oliver F. Rhodes
BY Clarence E. Threedy
HIS ATTORNEY.

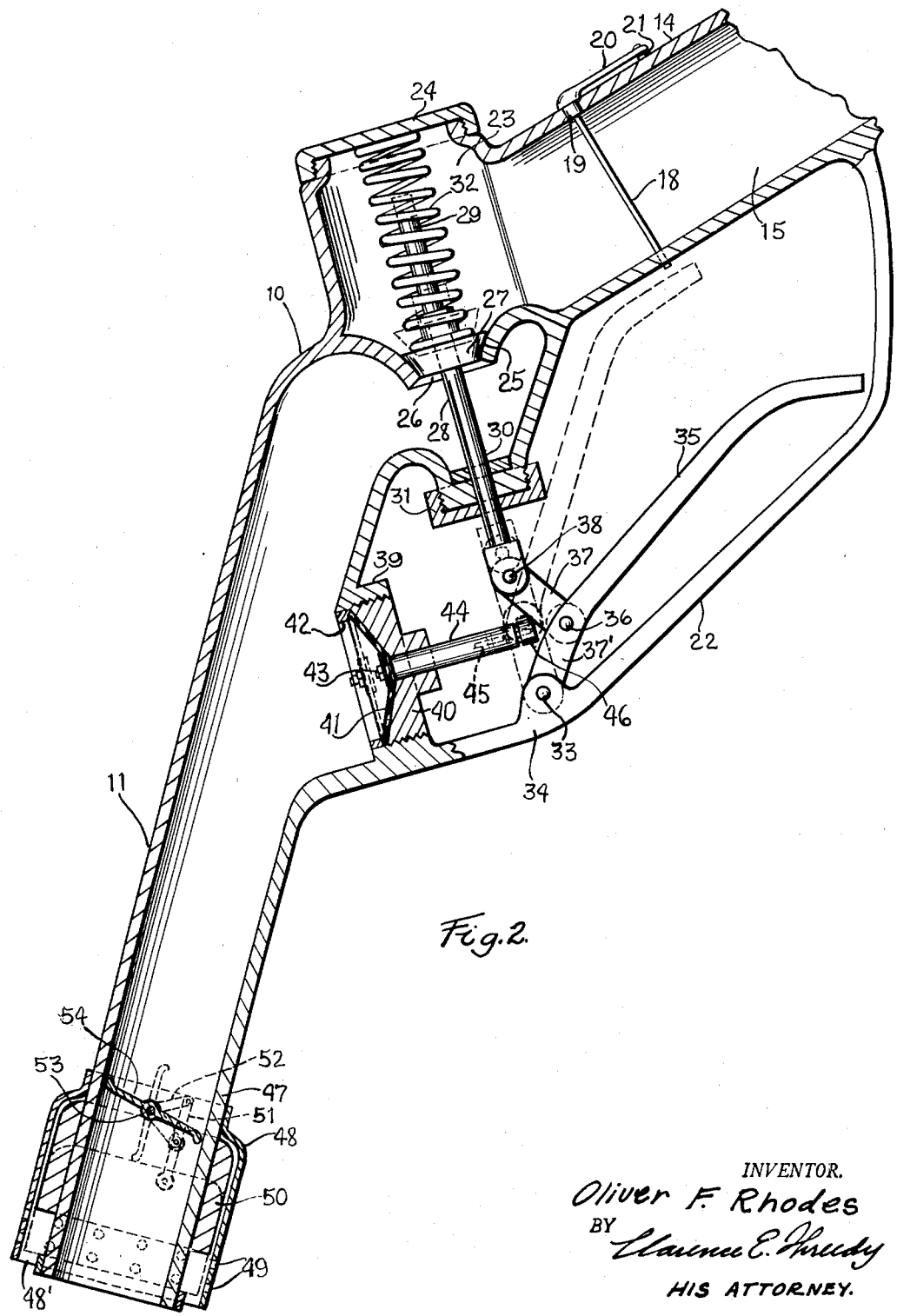

Patented Apr. 18, 1950

2,504,450

UNITED STATES PATENT OFFICE 2,504,450

LIQUID LEVEL CONTROLLED FILLING SPOUT

Oliver F. Rhodes, Peru, Ind.

Application February 12, 1947, Serial No. 728,159

5 Claims. (Cl. 226—127)

This invention relates to certain new and useful improvements in liquid level controlled filling spouts such as are especially adaptable for use in dispensing and delivering liquid from a supply tank to a container or other receptacle.

The invention has for a principal object the provision of an improved construction of this character which will be highly efficient in use and economical in manufacture.

Among the several objects of the invention is to provide a device of the character hereinafter referred to that will automatically shut off the flow of liquid from the supply tank to the container or other receptacle, when the liquid delivered to the container or other receptacle from the supply tank has reached within the container or other receptacle a predetermined level.

In accomplishing this object of the invention and ancillary thereto, I propose to provide the cut-off mechanism in association with the filling spout in a manner such that the shut-off operation is accomplished by the cooperative action of a float and the pressure of the liquid through the spout with no mechanical interconnections between the float mechanism and the mechanism actuated under the pressure of the liquid.

It is a common occurrence in filling a container, such for example the tank of an automobile, with gasoline from a supply tank, that the gasoline overflows from the gasoline tank, with the result that there is not only a loss of gasoline but also the flow upon the automobile body of the overflowing gasoline, presenting an unsightly and unpleasant appearance and ultimately, due to frequent occurrence of overflowing, resulting in injury to the finish of the automobile body. To prevent these undesirable conditions, I propose to utilize the buoyancy action of the fluid in the gasoline tank in cooperation with the pressure of the fluid through the nozzle to automatically shut off the flow of gasoline through the spout when the gasoline in the gasoline tank reaches a predetermined level.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of the invention showing the same applied to a tank or other receptacle fragmentarily shown in sectional detail, the parts of the filling spout being shown in fluid dispensing position;

Fig. 2 is an enlarged longitudinal cross sectional detail view of the spout embodied in the invention, the parts of the filling spout being shown in fluid obstructing position;

Fig. 3 is a fragmentary plan view taken substantially on line 3—3 of Fig. 1;

Fig. 4 is a sectional detail view taken substantially on line 4—4 of Fig. 3;

Fig. 5 is a fragmentary sectional detail view taken substantially on line 5—5 of Fig. 1;

Fig. 6 is a cross sectional detail view of the end of a spout similar to that illustrated in Fig. 2 but showing a modified form of construction;

Fig. 7 is a fragmentary sectional detail view taken substantially on line 7—7 of Fig. 6.

Referring to the accompanying drawings in which is illustrated the preferred embodiment of my invention, 10 indicates the body of the spout which in the form shown, (Figs. 1 and 2), includes a tube portion 11 that is adapted to be inserted through the nozzle 12 of a tank 13 into which fluid is to be delivered. This body 10 provides a handle 14 having a passage 15 therethrough and adapted to be connected as at 16 (Fig. 1) to one end portion of a supply hose 17. In this passage 15 is a valve disc 18 pivotally mounted as at 19 and providing a finger lever 20 adapted to selectively engage latch buttons 21 for latching the valve disc 18 in a predetermined position with respect to the passage 15.

The body 10 preferably provides a hand guard 22, hereinafter more fully set forth. Between the tube 11 and the handle 14, the body 10 provides a valve chamber 23, normally closed by a screw cap 24, and providing a valve seat 25 defining an orifice 26 through which communication is had between the passage 15 and the tube 11. A valve head 27 is adapted to engage the seat 25 and this valve head 27 is carried by a valve stem 28, one end portion 29 of which projects into the valve chamber 23, and the opposite portion 30 thereof is slidably mounted through a suitable packing nut structure 31 to the exterior of the body 10. The valve head 27 is normally urged into valve closing position with respect to the seat 25 by an expansion spring 32 (Fig. 2).

Pivotally connected as at 33 to the hand guard 22, or an extended portion 34 of the body 10, is a hand lever 35 disposed between the handle 14 and the hand guard 22 where it may be readily grasped within the hand and pivoted in a counterclockwise direction (as viewed in Fig. 2) for reasons hereinafter more fully apparent.

This hand lever 35 has pivoted connection as at 36 with a link 37 which provides, together with that portion 37' of the hand lever 35, a toggle, which link 37 and portion 37' are adapted to be disposed in alignment with respect to each other when the valve head 27 is disposed from valve closing position with respect to the seat 25, as shown in dotted lines in Fig. 2. The link 37 is pivotally connected as at 38 to the exterior end portion of the valve stem 28.

The body 10, at one side of the tube 11, provides a nipple 39. Threaded into this nipple 39 is a plug 40. Mounted on this plug 40 is a diaphragm 41, the peripheral edges of which are fixed beneath a retaining ring or bezel 42.

The diaphragm 41 is collapsible under pressure of the fluid in the tube 11, the pressure therein being created in a manner presently to be described. The diaphragm 41 is connected as at 43 to a stem 44 having a threaded bore 45 in which is threaded an adjustable head 46. The head 46 is adapted to engage the link 37 and portion 37' on a line bifurcating the longitudinal axis of the pivot 36.

The end 47 of the tube 11 has mounted thereon a shield 48 provided with a number of perforations 49. Within this shield 48 and between the shield 48 and the end 47 of the tube 11 is a float 50. This float 50 is pivotally connected by a link 51 to an arm 52 (Fig. 2). This arm 52 is fixed to one end portion of a shaft 53. On this shaft 53 is a valve disc 54.

The float 50 may be formed of any suitable material which has a buoyant action when contacting the liquid or fluid being delivered to the tank 13.

When filling the tank 13, the tube 11 (as shown in Figs. 1 and 2) is projected through the nozzle 12. The operator holds the body 10 in his hand through the medium of the handle 14 and, by manipulation of his fingers, pivots the hand lever 35 from the full line position (shown in Fig. 2) to the dotted line position. This will dispose the links 37 and 37' constituting the toggle in alignment with respect to each other and move the valve stem 28 against the action of the spring 32 to dispose the valve head 27 from valve closing position with respect to the seat 26. Simultaneously with this movement of the valve stem 28, the stem 44 will be moved to the left (as viewed in Fig. 2) and dispose the diapraghm 41 from the position shown in full lines (Fig. 2) to that shown in dotted lines in said figure. With the parts in this position, the fluid now flows through the passage 15 through the orifice 26 into the tube 11 and therefrom into the tank 13. When the end of the tube 11 is projected through the nozzle 12 into the tank 13 (as shown in Fig. 1), the float 50, by its own weight, will rock the shaft 53 in a clockwise direction (as viewed in Fig. 2) to dispose the valve disc 54 in valve opening position (as shown in full lines, Fig. 2). As the fluid in the tank 13 approaches a predetermined level, the fluid will flow into the shield 48, through the open end 48' thereof and the openings 49, and cause the float to move upwardly of the tube 11 to the position shown in full lines in Fig. 2. This movement of the float 50 will rock the shaft 53 in a counterclockwise direction to dispose the valve disc 54 in a position where the pressure of the fluid flowing through the tube 11 will complete the closing movement of the valve disc 54. When in this closed position, the flow of fluid from the tube 11, having been thus cut off by the valve disc 54, the back pressure thereof will act upon the diaphragm 41, collapse the same, and move the valve stem 44 to the right (as viewed in Fig. 2). This movement of the stem 44 in this direction will break the toggle, causing the link 37 and portion 37' to pivot to the position shown in full lines (Fig. 2) under the action of the spring 32, thereby allowing the valve head 27 to move under the action of the spring 32 to valve closing position.

To permit again the flow of fluid through the tube 11, the operator resets the parts (that is, the valve head 27 in valve opening position and the diaphragm in a flat condition with the link 37 and portion 37', constituting the toggle, in alignment), by pivoting the hand lever 35 from the position shown in full lines to that shown in dotted lines (Fig. 2). Upon withdrawal of the tube 11 from the nozzle 12, the float will return to its position as shown in dotted lines (Fig. 2), to return the valve disc 54 to valve opening position with respect to the tube 11, as shown in dotted lines (Fig. 2).

To regulate the flow of fluid through the passage 15, the operator may adjust the valve disc 18 to a proper position with respect to the passage 15.

Thus, it is apparent that my device controls the flow of fluid into a tank to a predetermined level by mechanism operated by the cooperation of the buoyancy of a float, and the pressure of the fluid in the tube of the spout, without any mechanical connection between the float or the mechanism operated by the fluid pressure. The simplicity and efficiency of my invention are apparent from the foregoing description.

In Figs. 6 and 7, I have illustrated a slightly modified form of construction over that shown in Figs. 1 and 2. In the illustration in the forms shown in Figs. 6 and 7, parts similar to those shown in Figs. 1 and 2 will be indicated by similar reference numerals.

In the form shown in Figs. 6 and 7, the shield 55 has the tube 11 inserted therein concentrically with respect thereto and the float 56 is in plan view crescent-shaped, disposed between the tube 11 and the shield 55. The shaft 53, carrying the valve disc 54, has its opposite end portions connected to a U-shaped bail 57, in turn pivotally connected to the float 56 by a link 58. The operation of the float and valve disc (shown in Figs. 6 and 7) is substantially the same as the float 50 and valve disc 54 in the form shown in Figs. 1 and 2.

It is obvious that my improved filling spout may be used for controlling the flow of fluid to tanks and containers of sundry forms and descriptions.

While I have illustrated and described the preferred form of construction for carrying my invention into effect, this is capable of variation and modifications without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A filling spout comprising a body providing a tube, a handle providing a passage and having communication with the tube through an orifice provided by the body, a spring valve in said body for closing said orifice, a valve in said tube for closing passage through said tube, a buoyant member carried by said tube for closing said valve in said tube, fluid pressure actuated means arranged in said tube and actuated by the pressure of fluid in said tube when said valve in said tube is closed, a toggle providing operative connection between said fluid pressure actuated means and said spring valve for closing said spring valve when the fluid pressure in said tube actuates said fluid pressure actuated means, and a handle integral with the toggle to actuate the toggle to open said spring valve and reset said pressure-actuated means into a normal position when said valve in said tube is in open position with respect to said tube.

2. A filling spout comprising a body providing a tube, a handle providing a passage and having communication with the tube through an orifice provided by the body, a spring valve in said body for closing said orifice, a valve in said tube for closing passage through said tube, a buoyant member carried by said tube for closing said valve in said tube, fluid pressure actuated means arranged in said tube and actuated by the pressure of fluid in said tube when said valve in said tube is closed, operative connection between said fluid pressure actuated means and said spring valve for closing said spring valve when the fluid pressure in said tube actuates said fluid pressure actuated means, said buoyant member including a float movable longitudinally of the tube, and a shield surrounding said float.

3. A filling spout comprising a body providing a tube, a handle providing a passage and having communication with the tube through an orifice provided by the body, a spring valve in said body for closing said orifice, a valve in said tube for closing passage through said tube, a buoyant member carried by said tube for closing said valve in said tube, and fluid pressure actuated means arranged in said tube and actuated by the pressure of fluid in said tube when said valve in said tube is closed, and operative connection between said fluid pressure actuated means and said spring valve for closing said spring valve when the fluid pressure in said tube actuates said fluid pressure actuated means, said operative connection between said pressure actuated means and said spring valve including a toggle and a hand lever for resetting said toggle against the action of said fluid actuated means.

4. A filling spout comprising a body having means for the passage of the fluid therethrough, means in said passage adjacent the outlet end thereof for closing said passage and adapted to be actuated by the buoyant action of a fluid, and means in said body adjacent the inlet end thereof and actuated by pressure of fluid in said body for shutting off the flow of fluid through said passage, said last named means including a spring valve having a toggle construction and a pressure actuated diaphragm for breaking said toggle.

5. Means for regulating the flow of fluid into a tank through a filling spout in which spout there is a valve for controlling passage through the spout and a fluid pressure actuated means arranged in the tube of the spout, comprising a handle providing a link pivotally connected to an adjacent portion of the spout, a link pivotally connecting the link of the handle to the valve, and a member of the fluid pressure actuated means having pivotal connection with the handle at the point of pivotal connection between the link of the handle and the link pivotally connected to the valve, for the purposes substantially described.

OLIVER F. RHODES.

REFERENCES CITED

The following references are of record in the file of this patent:

UNITED STATES PATENTS

| Number | Name | Date |
|---|---|---|
| 2,363,123 | Franck | Nov. 25, 1944 |
| 2,418,280 | Steen | Apr. 1, 1947 |